United States Patent
Akin et al.

(10) Patent No.: US 12,049,832 B2
(45) Date of Patent: Jul. 30, 2024

(54) COOLING HOLE POSITIONING SYSTEMS AND METHODS

(71) Applicant: General Electric Company, Schenectady, NY (US)

(72) Inventors: Selim Akin, Istanbul (TR); Yusuf Eren Ozturk, Istanbul (TR); Ertugrul Dursun, Instanbul (TR)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/147,138

(22) Filed: Dec. 28, 2022

(65) Prior Publication Data

US 2024/0218794 A1 Jul. 4, 2024

(51) Int. Cl.
| | |
|---|---|
| F01D 5/00 | (2006.01) |
| G06T 7/60 | (2017.01) |
| G06T 7/70 | (2017.01) |

(52) U.S. Cl.
CPC ............ F01D 5/005 (2013.01); G06T 7/60 (2013.01); G06T 7/70 (2017.01); F05D 2230/80 (2013.01); F05D 2260/80 (2013.01); F05D 2270/8041 (2013.01); G06T 2207/30164 (2013.01)

(58) Field of Classification Search
CPC ... F01D 5/005; G06T 7/60; G06T 7/70; G06T 2207/30164; F05D 2230/80; F05D 2260/80; F05D 2270/8041
See application file for complete search history.

(56) References Cited

U.S. PATENT DOCUMENTS

| | | | |
|---|---|---|---|
| 5,111,046 A | 5/1992 | Bantel | |
| 5,125,035 A | 6/1992 | McCarthy | |
| 5,216,808 A | 6/1993 | Martus | |
| 5,319,567 A | 6/1994 | Ebenstein | |
| 5,481,483 A | 1/1996 | Ebenstein | |
| 5,796,619 A * | 8/1998 | Wampler | G05B 19/41 |
| | | | 700/195 |
| 5,848,115 A | 12/1998 | Little | |
| 6,723,951 B1 * | 4/2004 | McGraw | B23K 26/04 |
| | | | 219/121.71 |
| 7,388,980 B2 | 6/2008 | Vaidyanathan | |
| 9,052,707 B2 | 6/2015 | Quitter | |
| 9,091,628 B2 | 7/2015 | Sezen | |
| 9,348,001 B2 | 5/2016 | Reid | |
| 9,707,645 B2 | 7/2017 | Ozturk | |

(Continued)

*Primary Examiner* — J. Todd Newton
(74) *Attorney, Agent, or Firm* — Armstrong Teasdale LLP

(57) ABSTRACT

Systems and methods to locate the position of cooling holes on an outer surface of a turbine engine component, based on a three-dimensional measurement along an X-axis, a Y-axis, and a Z-axis, and an extracted two-dimensional measurement along the X-axis and the Y-axis. The two-dimensional data is analyzed to find a common geometric feature of the component and determine a scan area based on the common geometric feature. The component is measured within the scan area to locate a cooling hole located on the outer surface of the component. A surface profile of the cooling hole is extracted along the X-axis and the Y-axis, and an orientation of the cooling hole is extracted along the Z-axis. A three-dimensional coordinate set of the cooling hole is calculated based on the surface profile and the orientation.

19 Claims, 11 Drawing Sheets

(56) References Cited

U.S. PATENT DOCUMENTS

| | | | |
|---|---|---|---|
| 9,760,986 B2* | 9/2017 | Ramamurthy | G06T 7/0006 |
| 9,967,523 B2* | 5/2018 | Ozturk | H04N 7/18 |
| 10,295,475 B2 | 5/2019 | Ritchey | |
| 10,859,367 B2 | 12/2020 | Ozturk | |
| 10,895,448 B2 | 1/2021 | Campion | |
| 11,407,067 B2 | 8/2022 | Turcotte | |
| 2002/0076097 A1* | 6/2002 | Vaidyanathan | G06T 7/73 |
| | | | 382/154 |
| 2004/0253105 A1* | 12/2004 | Vaidyanathan | F01D 5/288 |
| | | | 416/61 |
| 2006/0157456 A1* | 7/2006 | Hoebel | B23K 26/389 |
| | | | 219/121.71 |
| 2006/0291716 A1* | 12/2006 | Vaidyanathan | G06V 30/144 |
| | | | 382/152 |
| 2007/0019213 A1* | 1/2007 | Vaidyanathan | G06T 7/73 |
| | | | 356/626 |
| 2009/0220349 A1* | 9/2009 | Bolms | F01D 5/005 |
| | | | 451/6 |
| 2012/0167389 A1 | 7/2012 | Lacy | |
| 2015/0190890 A1* | 7/2015 | Ozturk | B26F 1/26 |
| | | | 408/1 R |
| 2016/0223315 A1* | 8/2016 | Ozturk | G01B 11/002 |
| 2017/0132775 A1* | 5/2017 | Ramamurthy | G06T 15/10 |
| 2017/0140539 A1* | 5/2017 | Wang | B25J 9/1697 |
| 2017/0180679 A1* | 6/2017 | Ozturk | G01B 11/24 |
| 2020/0001404 A1* | 1/2020 | Turcotte | B23K 26/389 |
| 2021/0383030 A1* | 12/2021 | Ramamurthy | F01D 5/005 |
| 2021/0404379 A1 | 12/2021 | Giambra | |
| 2022/0001500 A1* | 1/2022 | Rahman | B23B 35/00 |
| 2022/0135006 A1 | 5/2022 | Graham | |
| 2022/0136405 A1 | 5/2022 | Graham | |
| 2022/0138699 A1 | 5/2022 | Graham | |
| 2022/0351351 A1 | 11/2022 | Pulisciano | |
| 2022/0351352 A1 | 11/2022 | Pulisciano | |

* cited by examiner

COOLING HOLE POSITIONING SYSTEMS AND METHODS

BACKGROUND

The present disclosure relates generally to cooling hole positioning systems and methods and, more specifically, to systems and methods for locating cooling holes on used turbine engine components and using the collected positional data to automate the reopening of the cooling holes after the used components have been recoated.

Turbine engines, such as a gas turbine engine or a steam turbine engine, are widely used in industrial and power generation operations. As such, turbine engines are subjected to prolonged high temperatures, which may over time cause deformation of the components of the turbine engine. Accordingly, a coating may be applied to the turbine engine components to facilitate protecting the components from heat damage, such as a thermal barrier coating for a gas turbine engine or a rust-inhibitor coating for a steam turbine engine. Additionally, the turbine engine components may include cooling holes to facilitate improving the air circulation around the components to reduce damage from prolonged exposure to high temperatures.

Typically, the cooling holes need to be "reopened" after a coating is applied to a turbine engine component. Computer modeling (e.g., CAD models) may be used to determine the three-dimensional positions of the cooling holes for unused turbine engine components. However, because of potential creep of cooling hole positions from heat deformation of the turbine engine components that have been exposed to prolonged high temperatures, a computer model may be less reliable for locating the cooling holes of used components. Thus, cooling holes on used turbine engine components often must be located manually, reducing the efficiency of the repair, re-coating, and cooling hole reopening processes. Accordingly, there exists a need for systems and methods for use in locating cooling holes on used turbine engine components and using the collected positional data to automate the reopening of the cooling holes after the used components have been recoated.

BRIEF DESCRIPTION

In one aspect, a positioning method for use with a component of a turbine engine is provided. The method includes measuring an outer surface of the component along an X-axis, a Y-axis, and a Z-axis to obtain three-dimensional data including X-axis data points, Y-axis data points, and Z-axis data points. The method also includes extracting two-dimensional data along the X-axis and the Y-axis, including the X-axis data points and the Y-axis data points. The method also includes analyzing the two-dimensional data to find a common geometric feature of the component, analyzing the two-dimensional data to determine a scan area based on the common geometric feature of the component, and measuring the component within the scan area along the X-axis, the Y-axis, and the Z-axis to locate a cooling hole located on the outer surface of the component. The method also includes extracting at least one surface profile of the cooling hole along the X-axis and the Y-axis and extracting an orientation of the cooling hole along the Z-axis. The method further includes calculating a three-dimensional coordinate set of the cooling hole along the X-axis, the Y-axis, and the Z-axis based on the at least one surface profile and the orientation, wherein the three-dimensional coordinate set comprises X-axis data points, Y-axis data points, and Z-axis data points.

In another aspect, a positioning method for use with a component of a turbine engine is provided. The method includes collecting a plurality of cross-sections of a cooling hole along a surface height, the plurality of cross-sections each being along an X-axis and a Y-axis, wherein each of the plurality of cross-sections correlates a depth of the cooling hole to a surface width. The method also includes analyzing each of the plurality of cross-sections and detecting a maximum cross-section depth for each of the plurality of cross-sections. The method further includes extracting an orientation of the cooling hole along a Z-axis, wherein the orientation comprises the maximum cross-section depth of each of the plurality of cross-sections.

In yet another aspect, a positioning system for use with a component of a turbine engine is provided. The positioning system includes a data acquisition system configured to examine a cooling hole located on an outer surface of the component, wherein the data acquisition system comprises an imaging device configured to obtain an image of the component. The positioning system also includes a processor in operable communication with the data acquisition system. The processor is configured to measure the outer surface of the component along an X-axis, a Y-axis, and a Z-axis to obtain three-dimensional data including X-axis data points, Y-axis data points, and Z-axis data points. The processor is also configured to extract two-dimensional data along the X-axis and the Y-axis, including the X-axis data points and the Y-axis data points. The processor is also configured to analyze the two-dimensional data to find a common geometric feature of the component and analyze the two-dimensional data to determine a scan area based on the common geometric feature of the component. The processor is also configured to measure the component within the scan area along the X-axis, the Y-axis, and the Z-axis to locate a cooling hole located on the outer surface of the component, extract at least one surface profile of the cooling hole along the X-axis and the Y-axis, and extract an orientation of the cooling hole along the Z-axis. The processor is further configured to calculate a three-dimensional coordinate set of the cooling hole along the X-axis, the Y-axis, and the Z-axis based on the at least one surface profile and the orientation, wherein the three-dimensional coordinate set comprises X-axis data points, Y-axis data points, and Z-axis data points.

DETAILED DESCRIPTION

The embodiments described herein relate to systems and methods for locating cooling holes on used turbine engine components and using the collected positional data to automate the reopening of the cooling holes after the used components have been recoated, such as with a thermal barrier coating or a rust-inhibitor coating.

The systems and methods described herein facilitate the automated locating of cooling holes on used turbine engine components. The advantages of the systems and methods described herein include, at least: (i) improved accuracy of the automated locating of cooling holes due to the use of a common geometric feature of a used turbine engine component as a reference baseline for measurements; (ii) improved accuracy and repeatability of the automated locating of cooling holes of a used turbine engine component due to the use of a calibrated scan area for measurements, as opposed to a computer model; and (iii) reduced cost of the automated locating of cooling holes due to the use of a laser line projector, as opposed to a blue light scanner.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
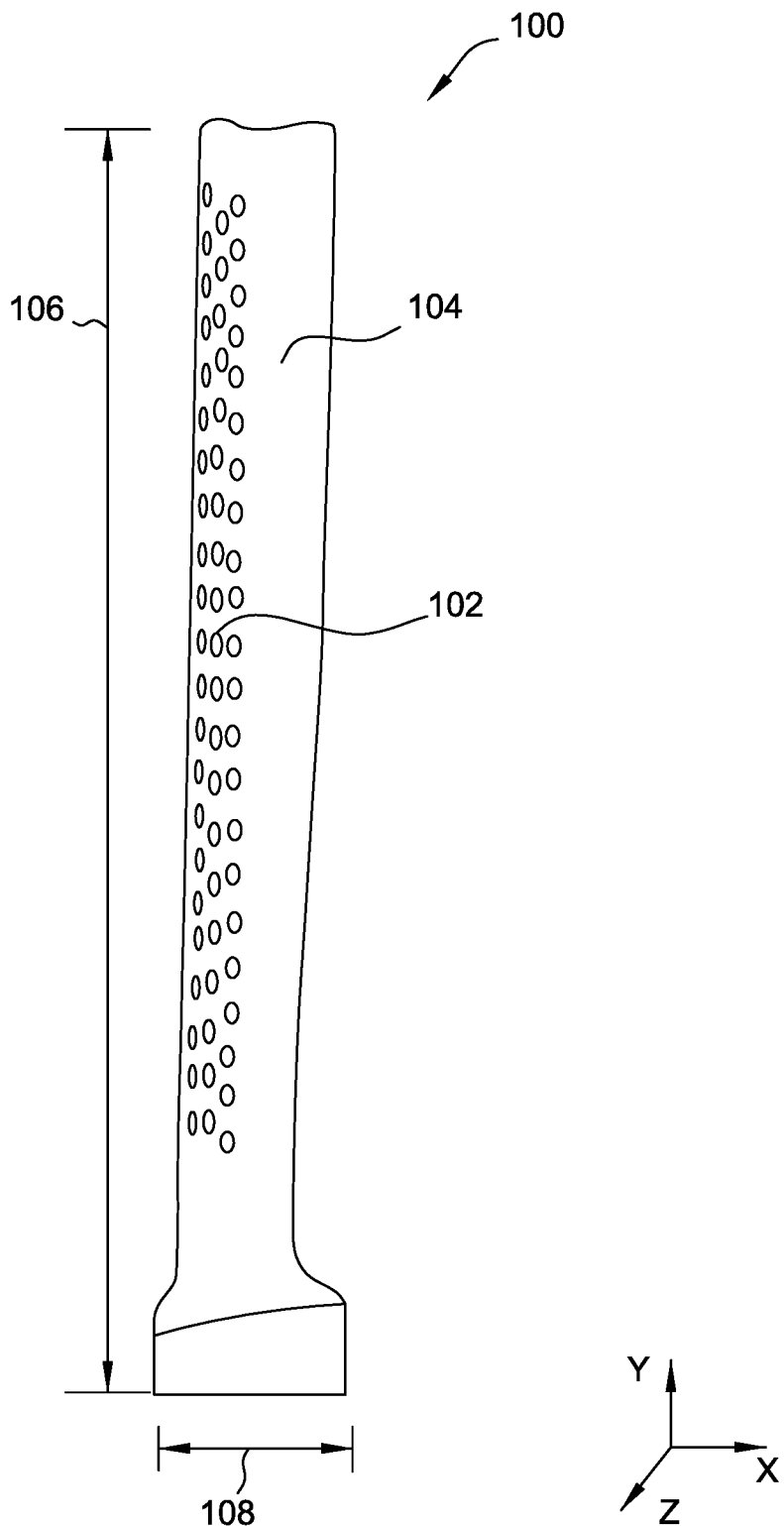
FIG. 1 is a schematic illustration of an exemplary turbine engine component.

FIG. 1 is a schematic illustration of an exemplary turbine engine component 100. Component 100 may be any of a variety of component types used in a variety of turbine engine applications, such as, for example, components utilized in high temperature applications. In some embodiments, component 100 may be a turbine blade, compressor blade, vane, nozzle, shroud, rotor, transition piece, and/or rotor casing. In other embodiments, component 100 may be any other component of a turbine engine. In the exemplary embodiment, component 100 includes a plurality of cooling holes 102 formed therein. Cooling holes 102 may facilitate an improvement in air circulation around component 100 during operation of the turbine engine, thus facilitating a reduction in the deformation of component 100 resulting from prolonged exposure to high temperatures. In the exemplary embodiment, component 100 includes an outer surface 104 on which cooling holes 102 are spaced. Cooling holes 102 may be spaced across outer surface 104 using any suitable technique during or after manufacture of component 100.

In the exemplary embodiment, component 100 has a length 106 and a width 108. In the following description, component 100 may be described as extending "vertically," or along a vertical Y direction, or "horizontally," or along a horizontal X-Z plane. It should be understood that these phrases are descriptive and should not be construed in an overly limiting manner. In the illustrated embodiment of FIG. 1, length 106 extends vertically along the vertical Y direction and width 108 extends horizontally along the horizontal X-Z plane. The measurements of length 106 and width 108 of component 100 may vary and component 100 should not be construed as being limited to the illustrated shape (as shown in FIG. 1) formed by length 106 and width 108.

Figure 2:
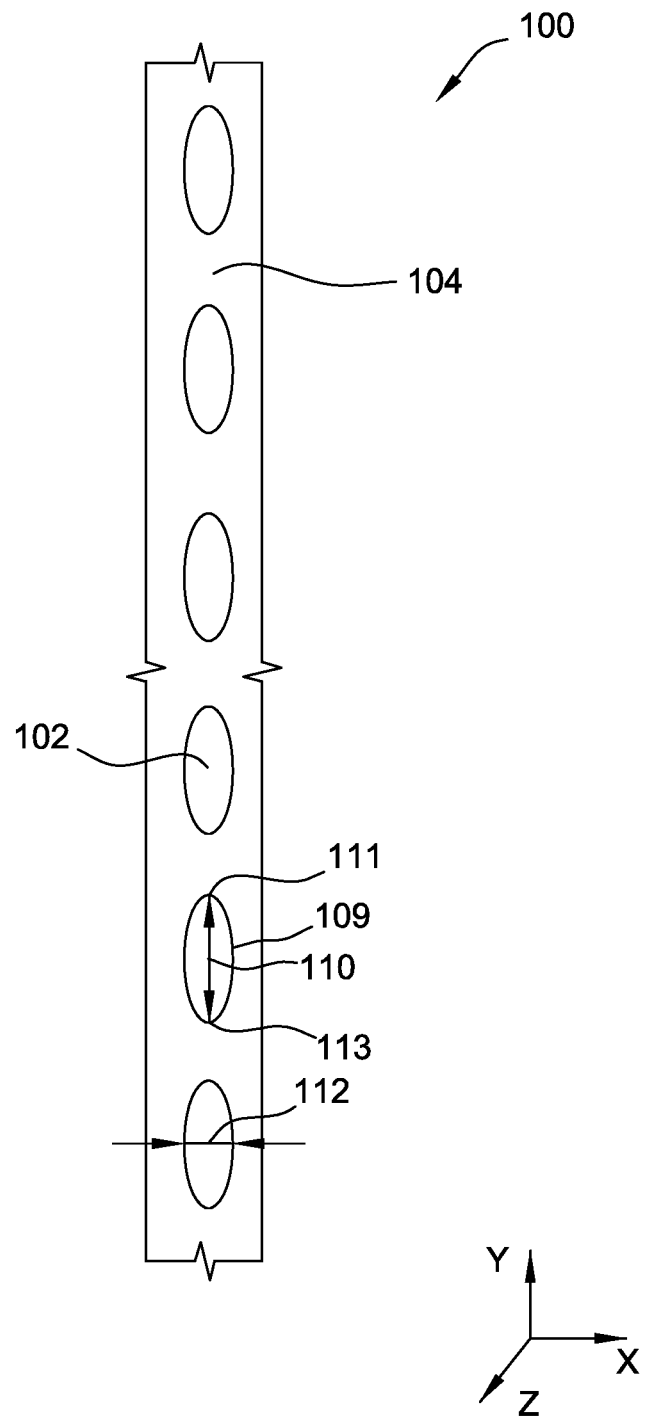
FIG. 2 is a schematic illustration of a front view of the turbine engine component of FIG. 1.
Figure 3:
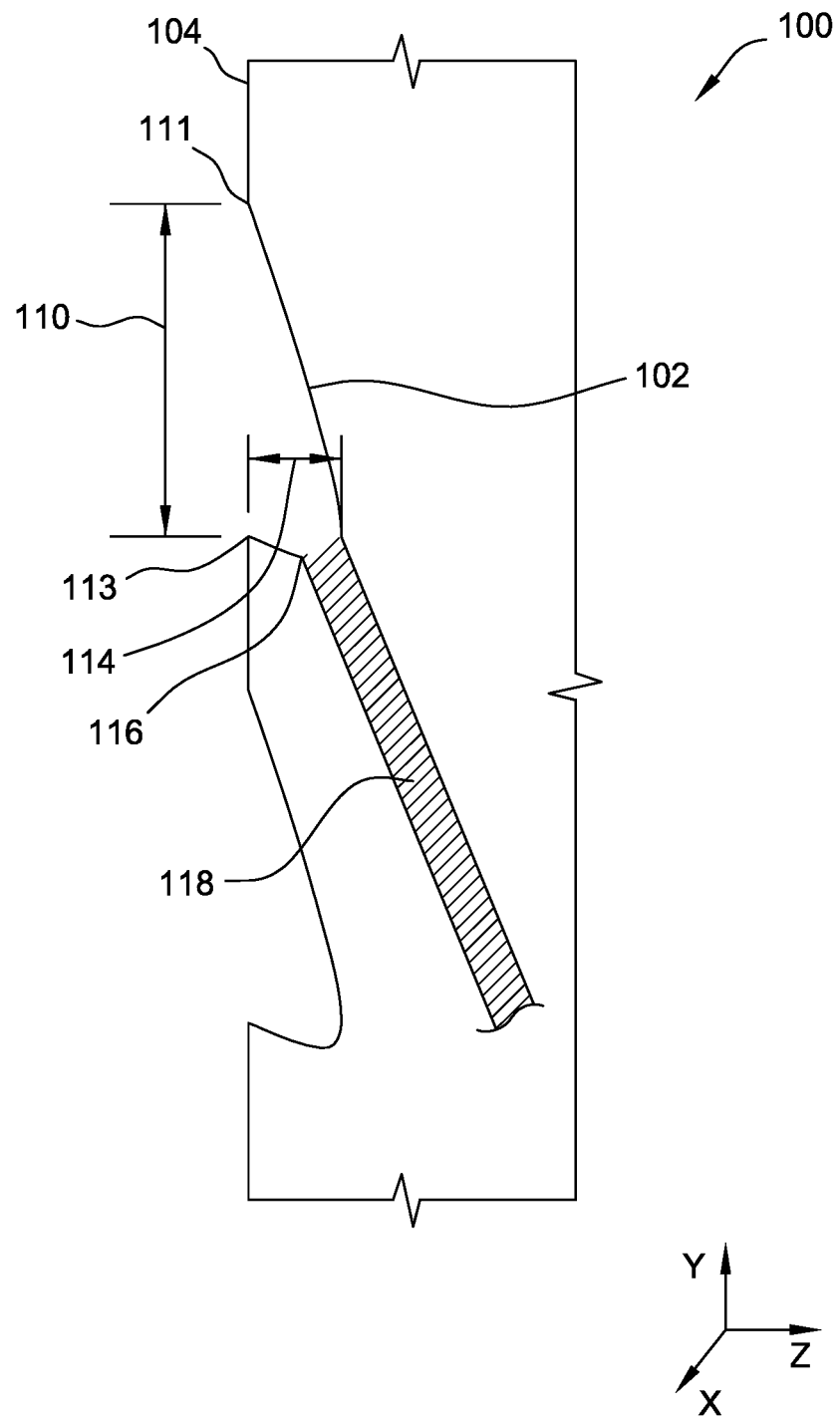
FIG. 3 is a schematic illustration of a side cross-sectional view of the turbine engine component of FIG. 1.

FIGS. 2 and 3 are schematic illustrations of exemplary cooling holes 102 formed in component 100. More specifically, FIG. 2 illustrates a front view of component 100 and FIG. 3 illustrates a side cross-sectional view of component 100. In the exemplary embodiment, cooling holes 102 have an elliptical shape on outer surface 104 when viewed from the front, as shown in FIG. 2. Each cooling hole 102 is defined by a pair of sides 109, a top end 111, and a bottom end 113. As shown in FIG. 2, sides 109 extend along a surface height 110 of cooling holes 102, with surface height 110 defined between a vertex of each of top end 111 and bottom end 113. Additionally, as shown in FIG. 2, top end 111 and bottom end 113 each extend along a surface width 112 of cooling holes 102, with surface width 112 defined between a vertex of each side 109. Sides 109, top end 111, and bottom end 113 are all connected together with rounded junctions to form the elliptical shape of cooling holes 102. In the exemplary embodiment, as shown in FIGS. 1 and 2, surface height 110 extends vertically along length 106 (e.g., along the vertical Y direction) and surface width 112 extends horizontally along width 108 (e.g., along the horizontal X-Z plane).

As shown in FIG. 3, cooling holes 102 each extend into component 100 from outer surface 104 to a depth 114 that varies across surface height 110. In the exemplary embodiment, cooling holes 102 are formed to be shallowest at top end 111, with depth 114 being at a minimum, and deepest at or below bottom end 113, with depth 114 increasing across surface height 110 from top end 111 to bottom end 113. In the exemplary embodiment, depth 114 is deepest at a dip point 116 formed below bottom end 113 (e.g., beneath bottom end 113 in the vertical Y direction), at which point the cooling holes 104 connect to a channel 118 of a cooling air channel system of component 100.

Figure 4:
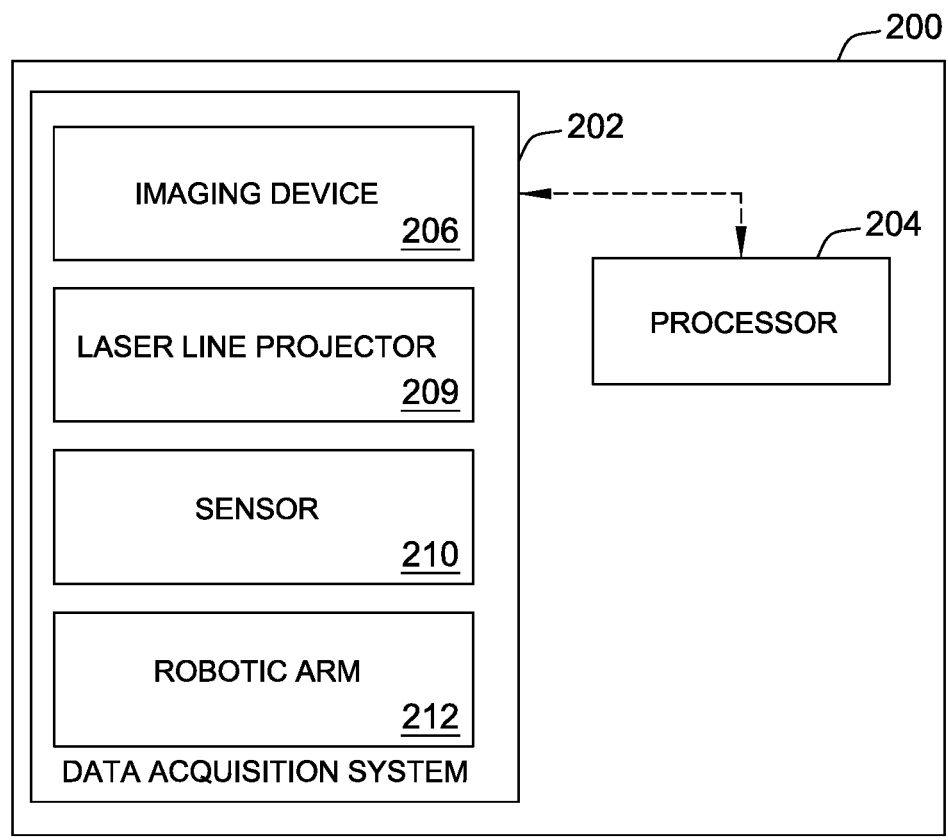
FIG. 4 is a schematic of an exemplary positioning system for use in analyzing the turbine engine component of FIG. 1.

FIG. 4 is a schematic diagram of an exemplary positioning system 200 that is used to locate cooling holes 102 across outer surface 104 of component 100. In the exemplary embodiment, positioning system 200 includes a data acquisition system 202 that acquires three-dimensional data associated with component 100 and cooling holes 102. Positioning system 200 also includes a processor 204 that analyzes the three-dimensional data acquired by data acquisition system 202.

Figure 5:
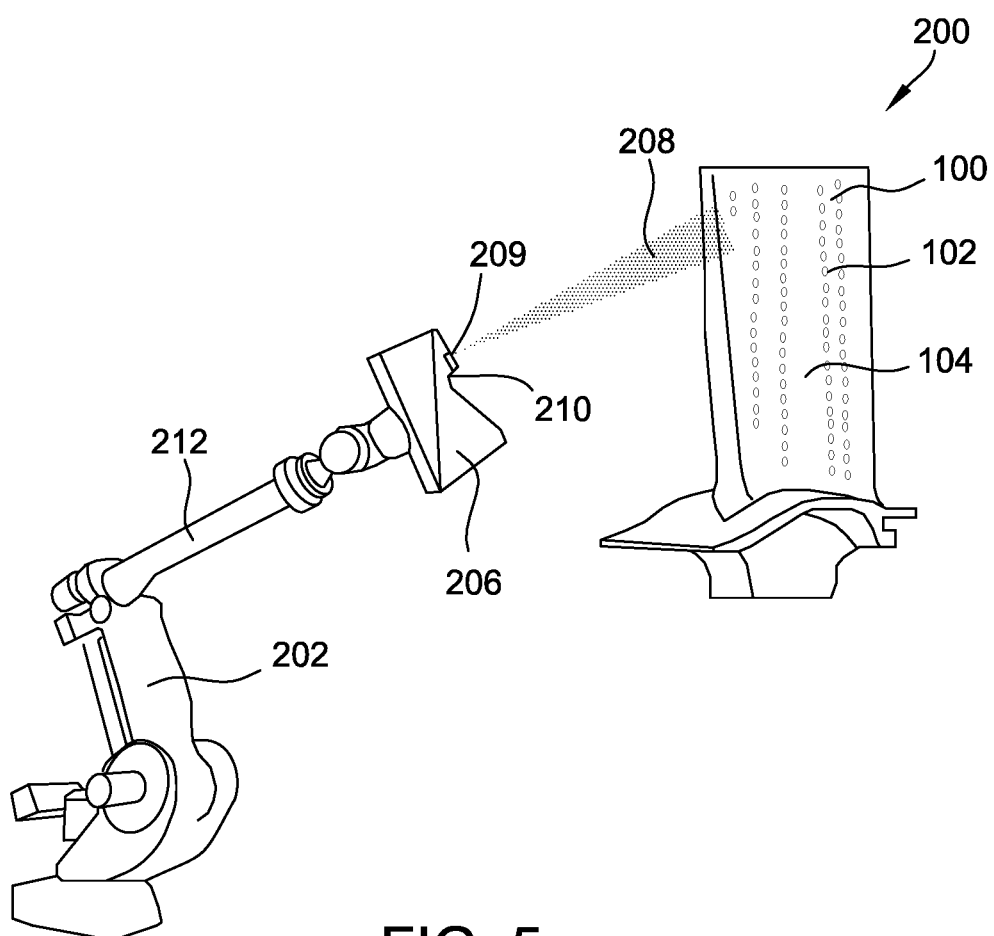
FIG. 5 is a schematic illustration of a portion of the positioning system of FIG. 4.
Figure 6:
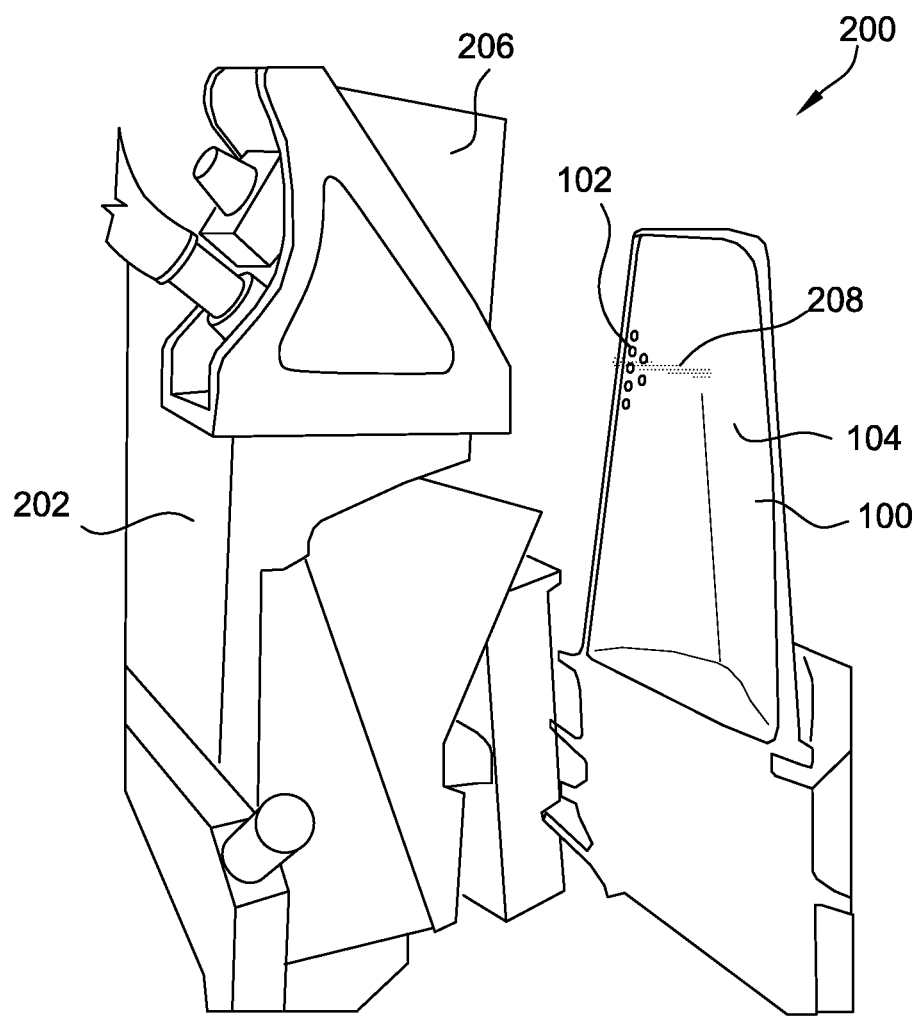
FIG. 6 is a schematic illustration of another portion of the positioning system of FIG. 4.

In the exemplary embodiment, data acquisition system 202 includes an imaging device 206 that obtains images of component 100. FIGS. 5 and 6 are schematic illustrations of an exemplary embodiment of imaging device 206 of data acquisition system 202 being used with component 100. Imaging device 206 may include a lens assembly and/or an image capture device to obtain images of component 100. In the exemplary embodiment, data acquisition system 202 communicates with processor 204 (as shown in FIG. 4). Processor 204 may be coupled to data acquisition system 202 via any suitable wired and/or wireless connection. Processor 204 may be programmed to analyze and/or store the images obtained by imaging device 206. Additionally, processor 204 may be programmed to operate components of data acquisition system 202, such as imaging device 206, to perform various steps as described herein.

In the exemplary embodiment, imaging device 206 examines and obtains three-dimensional measurements of component 100. Imaging device 206 may utilize any suitable surface metrology techniques to examine and obtain measurements of component 100 along the X-, Y-, and Z-axes. In the exemplary embodiment, data acquisition system 202 communicates with processor 204 to analyze the three-dimensional data obtained by imaging device 206 and to generate two-dimensional images of component 100.

As shown in FIGS. 5 and 6, data acquisition system 202 also includes a laser line projector 209 and a sensor 210. In the exemplary embodiment, data acquisition system 202 emits a light 208 in the form of laser beams from laser line projector 209. In some embodiments, data acquisition system 202 may obtain measurements of component 100 along the X-, Y-, and Z-axes based on the time elapsed for light 208 to travel from laser line projector 209 to outer surface 104 of component 100 and back to sensor 210. In other embodiments, data acquisition system 202 may obtain measurements of component 100 based on the amount of light 208 detected on outer surface 104 of component 100 along the X-, Y-, and Z-axes in relation to the field-of-view of sensor 210.

In the exemplary embodiment, light 208 is emitted from laser line projector 209 in a band that covers only a portion of component 100. As shown in FIG. 6, light 208 may be emitted as a line across component 100, with the line of light 208 aimed at a line of cooling holes 102 across component 100. As shown in FIGS. 5 and 6, data acquisition system 202 also includes a robotic arm 212 that selectively moves laser line projector 209 as needed to reflect light 208 from the entirety of outer surface 104 of component 100. Robotic arm 212 may support and facilitate the movement of other components of data acquisition system 202, such as sensor 210. Additionally, processor 204 may be programmed to operate robotic arm 212, such as via the various motors and/or drive components thereof, to selectively move robotic arm 212 and position the data acquisition system 202 relative to component 100, facilitating the measurement of component 100.

Processor 204 may include a computer, a controller, a microcontroller, a microcomputer, a programmable logic controller (PLC), an application specific integrated circuit, and/or other programmable circuits. Processor 204 may also include various input/output channels for receiving inputs from and sending control signals to various other components with which processor 204 is in communication, such as, but not limited to, imaging device 206. Processor 204 may be a single master processor in communication with the other various components of positioning system 200 and/or may include a plurality of individual component processors (such as, but not limited to, an imaging device processor and/or a three-dimensional data acquisition sub-system processor). The various individual component processors may be in communication with each other and may further be in communication with a master processor, and these components may collectively be referred to as processor 204.

Figure 7:
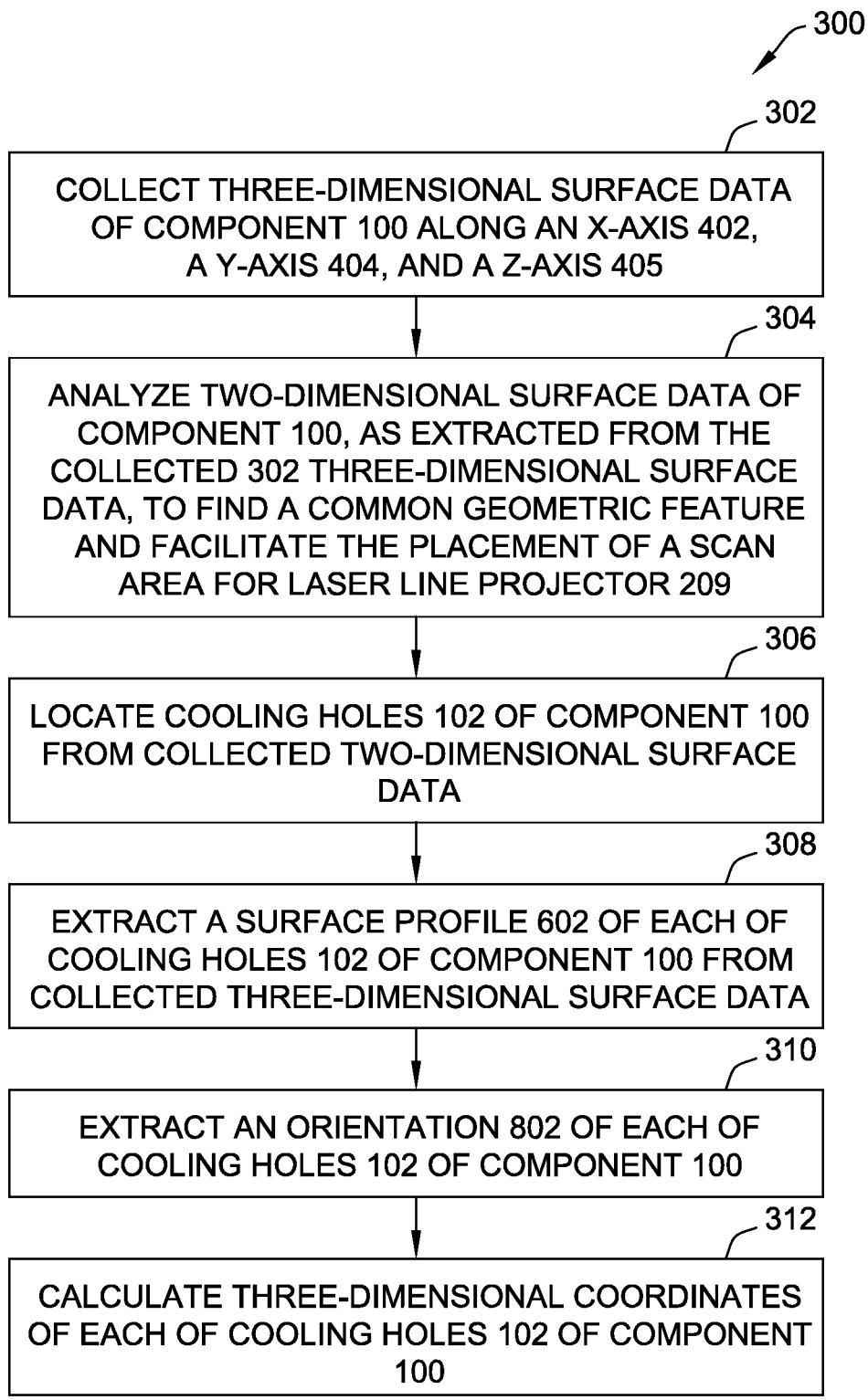
FIG. 7 is a flow chart illustrating an exemplary positioning method for use in analyzing the turbine engine component of FIG. 1.
Figure 8:
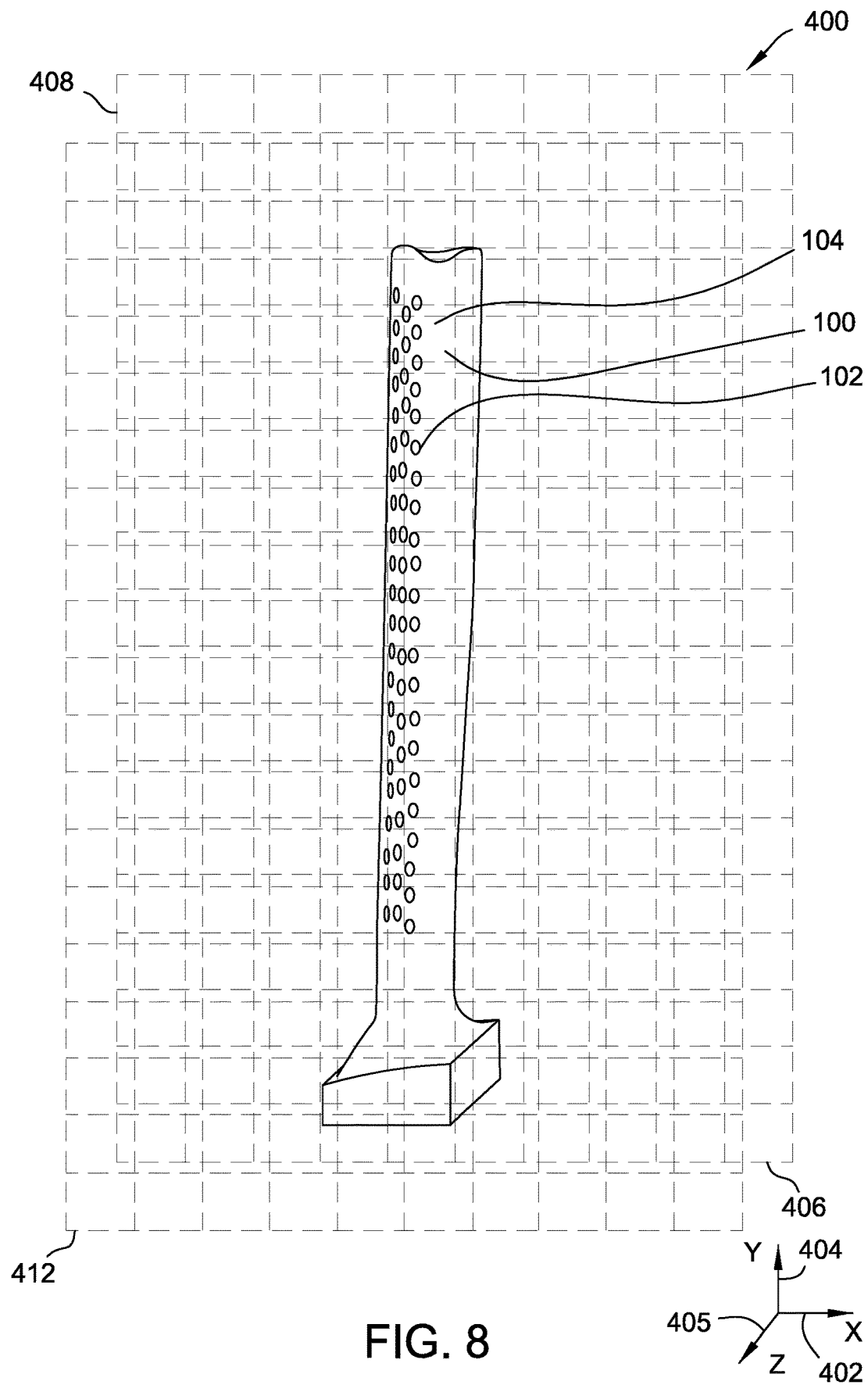
FIG. 8 is an exemplary illustration of a three-dimensional image of the turbine engine component of FIG. 1.

FIG. 7 is a flow chart of an exemplary positioning method 300 that locates cooling holes 102 across outer surface 104 of component 100. In the exemplary embodiment, processor 204 (as shown in FIG. 4) performs various steps of positioning method 300. Accordingly, positioning system 200 (as shown in FIG. 4) and positioning method 300 may cooperate as described herein. While positioning method 300 is described herein with reference to positioning system 200, it should be appreciated that positioning method 300 is not limited to positioning system 200, and positioning method 300 may be used in other embodiments. Moreover, positioning system 200 should not be understood to be limited to only being used with positioning method 300. FIG. 8 is an exemplary embodiment of a three-dimensional image 400 of component 100 and FIG. 9 is an exemplary embodiment of a two-dimensional image 500 of component 100, each of which may be obtained by imaging device 206 of data acquisition system 202 (as shown in FIG. 4) using positional method 300.

When positioning method 300 is implemented, as shown in FIG. 7, three-dimensional surface data of component 100 along an X-axis 402, a Y-axis 404, and a Z-axis 405 (as shown in FIG. 8) is collected 302. The three-dimensional surface data of component 100 may be collected using any suitable image analysis methods and includes X-axis data points 406, Y-axis data points 408, and Z-axis data points 412 (as shown in FIG. 8). Two-dimensional surface data of component 100 along the X-axis 402 and the Y-axis 404 (as shown in FIG. 9) is extracted from the three-dimensional surface data as collected 302 by data acquisition system 202.

Figure 9:
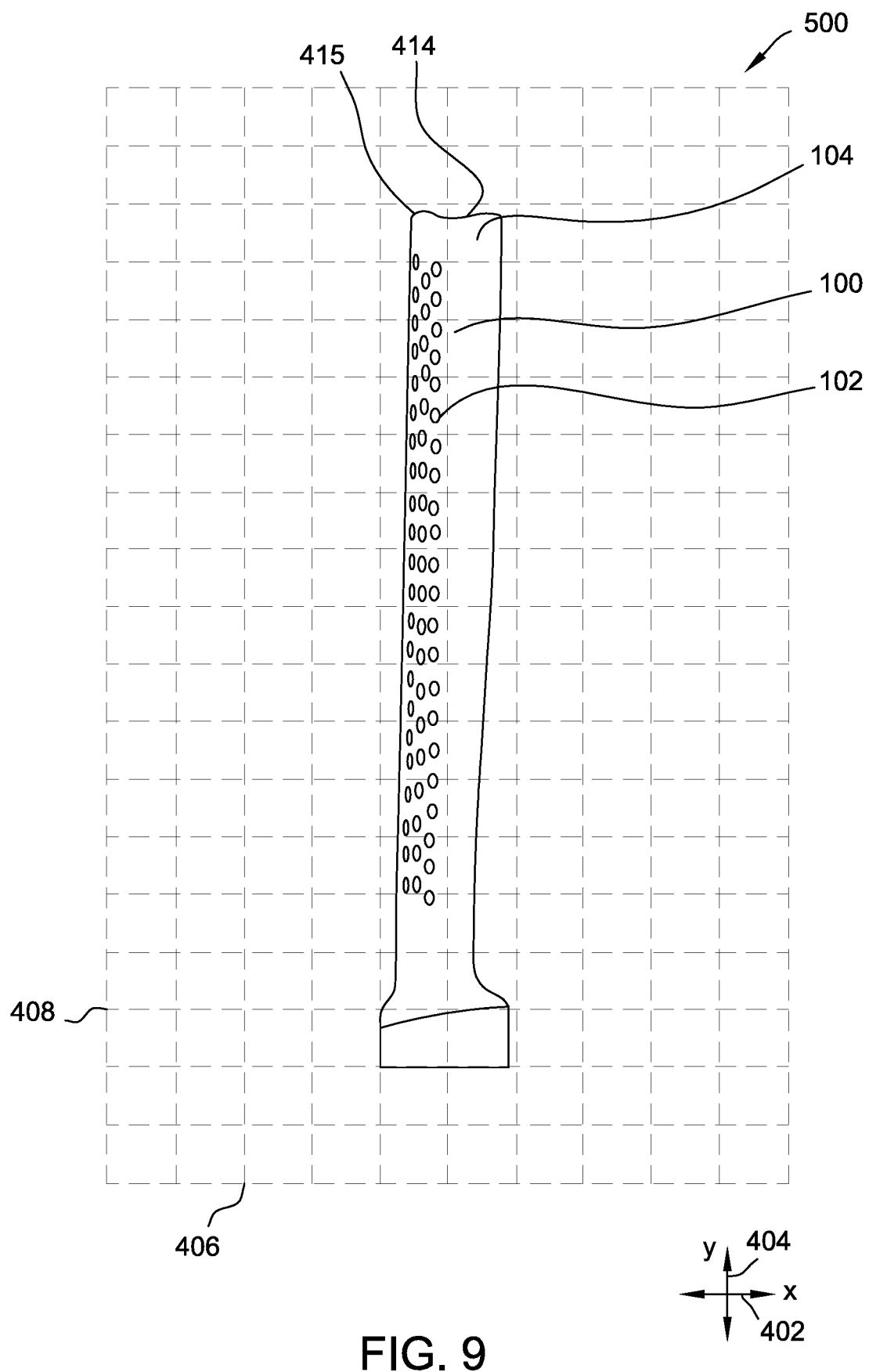
FIG. 9 is an exemplary illustration of a two-dimensional image of the turbine engine component of FIG. 1.

Positioning method 300 (as shown in FIG. 7) also includes analyzing 304 the two-dimensional surface data of component 100, such as from two-dimensional image 500 (as shown in FIG. 9), as extracted from the collected 302 three-dimensional surface data, to find a common geometric feature of component 100 and facilitate the placement of a scan area for laser line projector 209. In the exemplary embodiment, X-axis data points 406 and Y-axis data points 408 are in reference to the common geometric feature of a leading edge 414 of component 100 (as shown in FIG. 9), with a reference corner 415 of leading edge 414 serving as the (0,0) X-Y data point. The placement of the scan area is based on the X-axis and Y-axis data points 406, 408 in relation to reference corner 415 of leading edge 414. As the location of cooling holes 102 may change due to heat deformation of component 100 resulting from prolonged exposure to high temperatures, the placement of the scan area based on leading edge 414 may facilitate an improvement in imaging accuracy from which to locate cooling holes 102 of component 100.

In some embodiments, reference corner 415 of leading edge 414 may have X-axis and Y-axis data points other than (0,0), with a different feature of component 100 acting as the (0,0) X-Y data point from which to measure component 100 (such as a feature of component 100 that is unaffected by dimensional creep or operational damage). In other embodiments, the common geometric feature may be a different reference feature of component 100, such as a reference feature in the vicinity of the scan area that is not easily deformed by operating conditions of the turbine engine. The common geometric feature may include, but is not limited to, a leading edge, a corner of the leading edge, a trailing edge, a corner of the trailing edge, an angel wing corner, and/or a platform corner.

Positioning method 300 (as shown in FIG. 7) also includes locating 306 the cooling holes 102 of component 100 and extracting two-dimensional coordinates of each of cooling holes 102 from the extracted two-dimensional surface data, such as from two-dimensional image 500 (as shown in FIG. 9). Cooling holes 102 may be located from the two-dimensional surface data using any suitable image processing and machine learning analyses. For example, a pixel analysis may be used to locate cooling holes 102 spaced on outer surface 104 of component 100 based on a difference in color depth (e.g., differences in color or in greyscale) between individual pixels or groups of pixels. In some embodiments, the pixel analysis may include dividing the total number of pixels into groups based on color depth (e.g., darker or lighter color depths) to denote a certain reference point (e.g., cooling holes 102 or outer surface 104 of component 100). In other embodiments, different pixel analysis methods may be used to distinguish cooling holes 102 from outer surface 104 of component 100.

Figure 10A:
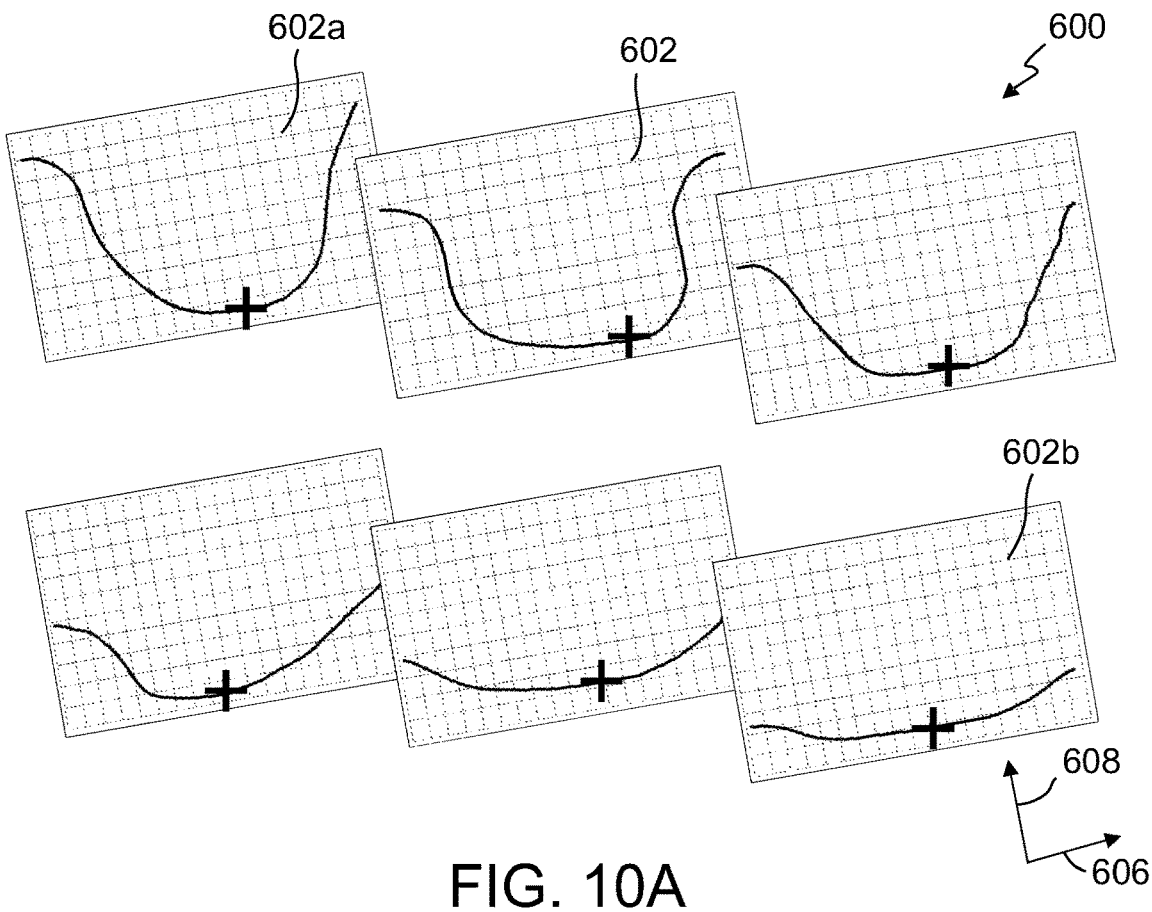
FIGS. 10A-10B are exemplary illustrations of a surface profile of a cooling hole of the turbine engine component of FIG. 1.
Figure 10B:
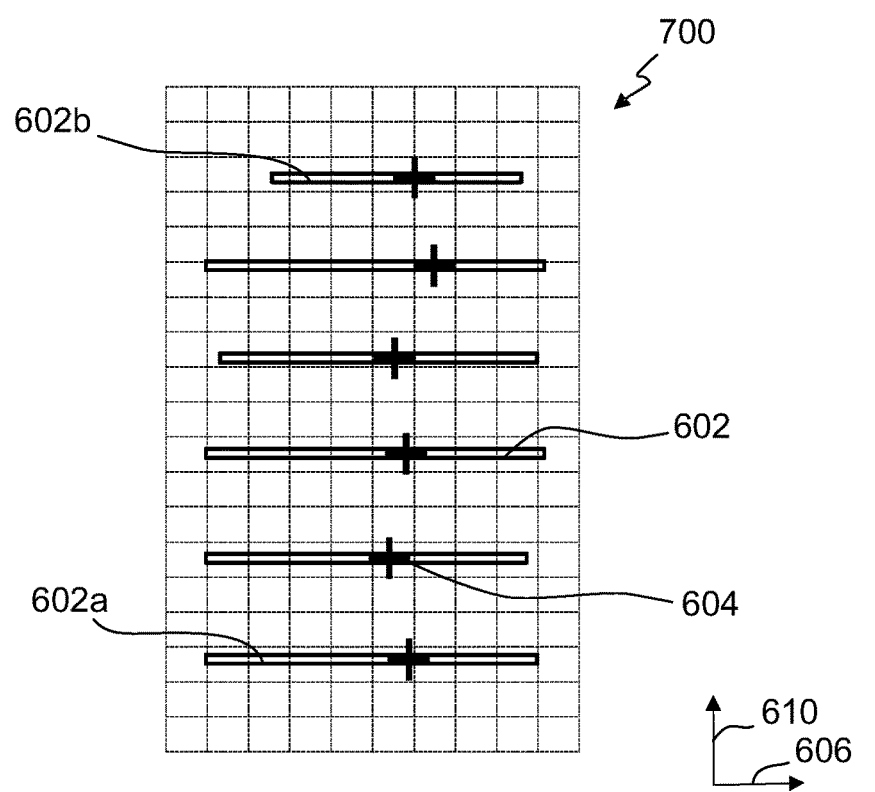

Positioning method 300 (as shown in FIG. 7) also includes extracting 308 a surface profile 602 of each of cooling holes 102 of component 100 (as shown in FIGS. 10A-10B) from the collected three-dimensional surface data, such as from three-dimensional image 400 (as shown in FIG. 8). The surface profile data may be extracted from the three-dimensional surface data using any suitable surface profiling analysis method. FIGS. 10A-10B are exemplary embodiments of plots of surface profile 602, as may be extracted from the three-dimensional surface data by processor 204 (as shown in FIG. 4). FIG. 10A illustrates surface profile 602 as a first plot 600 along a first axis 606 and a second axis 608 substantially perpendicular to first axis 606. FIG. 10B illustrates surface profile 602 as a second plot 700 along first axis 606 and a third axis 610 substantially perpendicular to first axis 606.

In the exemplary embodiment, surface profile 602 represents a horizontal cross-section (e.g., along the horizontal X-Z plane) of cooling hole 102, with surface profile 602 being substantially parallel to surface width 112 and substantially perpendicular to surface height 110 (as shown in FIG. 2). Surface profile 602 extends between sides 109 of cooling holes 102 (as shown in FIG. 2). First plot 600 illustrates surface profile 602 as surface height 110 (as shown in FIG. 2) displayed along first axis 606 and depth 114 (as shown in FIG. 3) displayed along second axis 608. Thus, first plot 600 illustrates how depth 114 of cooling holes 102 varies across surface height 110.

In the exemplary embodiment, first example 602a of first plot 600 illustrates a high degree of variance of depth 114 across surface height 110, as displayed by a generally U-shaped curve of data points. Additionally, for example, second example 602b of first plot 600 illustrates a low degree of variance of depth 114 across surface height 110, as displayed by a generally flattened curve of data points. Thus, the variability of curvature of first plot 600 (such as shown from first example 602a through second example 602b of FIG. 10A) corresponds to varying measurements of depth 114, with each example of first plot 600 including a maximum depth marker 604 to show a maximum measurement of depth 114 (e.g., a position across surface width 112 at which depth 114 is deepest) for that cross-section of cooling holes 102.

Positioning method 300 (as shown in FIG. 7) also includes extracting 310 an orientation 802 of each of cooling holes 102 of component 100 (as shown in FIG. 10B). Second plot 700 illustrates surface profile 602 as surface width 112 (as shown in FIG. 2) displayed along first axis 606 and each cross-section of surface profile 602 (as shown in FIG. 10A) displayed along third axis 610. Thus, second plot 700 illustrates an alignment of each cross-section of surface profile 602 with maximum depth marker 604 displayed along surface width 112.

Figure 11A:
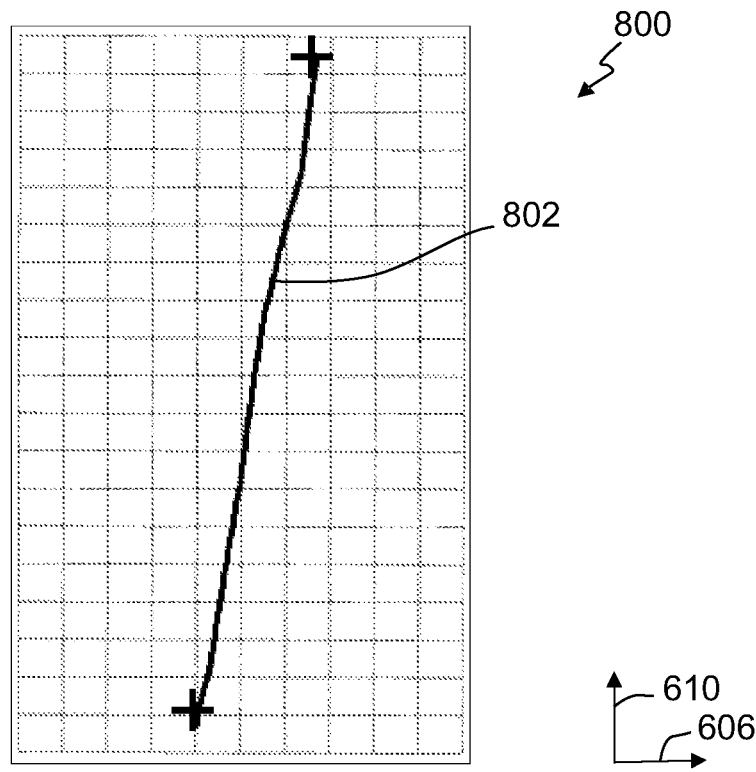
FIGS. 11A-11B are exemplary illustrations of another surface profile of the cooling hole of the turbine engine component of FIG. 1.
Figure 11B:
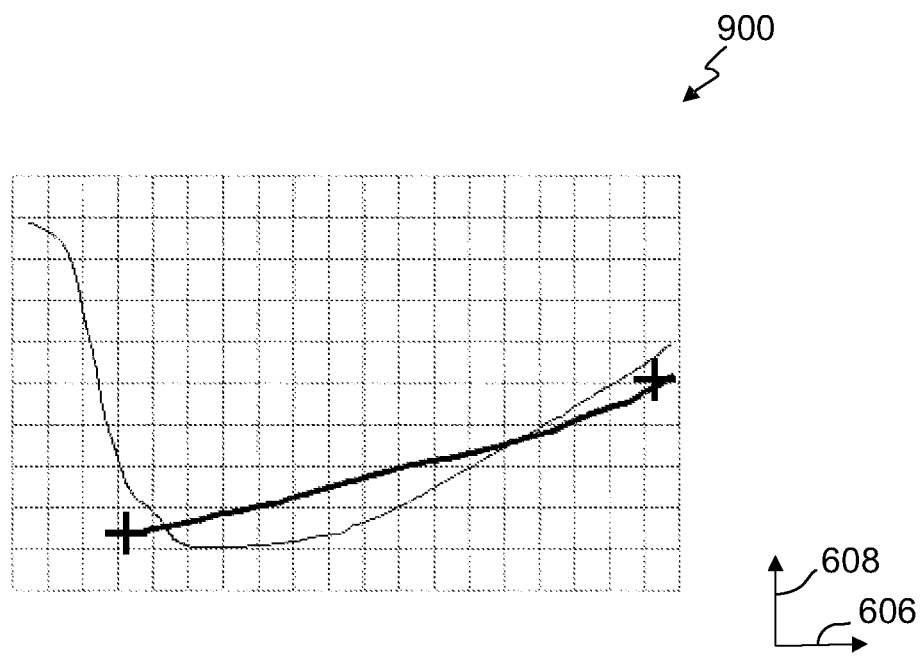

FIGS. 11A-11B are additional exemplary embodiments of plots of surface profile 602, specifically showing orientation 802 of cooling holes 102, as may be extracted from the three-dimensional surface data by processor 204 (as shown in FIG. 4). FIG. 11A illustrates surface profile 602 as a third plot 800 along first axis 606 and third axis 610, with a line connecting each maximum depth marker 604 (as shown in FIG. 10B) to display the orientation 802 along third axis 610. FIG. 11B illustrates surface profile 602 as a fourth plot 900 along first axis 606 and second axis 608, with surface height 110 (as shown in FIG. 3) displayed along first axis 606 and maximum depth marker 604 displayed along second axis 608. Thus, fourth plot 900 illustrates how maximum depth marker 604 varies across surface height 110.

Positioning method 300 (as shown in FIG. 7) further includes calculating 312 three-dimensional coordinates of each of cooling holes 102 of component 100 to construct an overall three-dimensional profile along the X-, Y-, and Z-axes. The calculation of the three-dimensional coordinates of each cooling hole 102 includes combining the data points obtained through locating 306 the cooling holes 102 from the collected two-dimensional surface data, extracting 308 the surface profile 602 of each of cooling holes 102 from the collected three-dimensional data, and extracting 310 the orientation 802 of each of cooling holes 102. In the exemplary embodiment, X-axis data points 406 and Y-axis data points 408 are known from locating 306 the cooling holes 102 from the collected two-dimensional data. Additionally, in the exemplary embodiment, Z-axis data points 412 are known from extracting 308 the surface profile 602 of each of cooling holes 102 from the collected three-dimensional data and extracting 310 the orientation 802 of each of cooling holes 102.

Exemplary systems and methods for locating cooling holes on used turbine engine components and using the collected positional data to automate the reopening of the cooling holes after the used components have been recoated are described herein. The exemplary systems and methods as described herein provide several advantages over conventional designs and processes, including improved accuracy and repeatability of the locating of cooling holes for used turbine engine components due to the use of a calibrated scan area for measurements based on a leading edge of the used turbine engine component.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims. The systems and methods described herein are not limited to the specific embodiments described herein, but rather portions of the various systems may be utilized independently and separately from other systems and methods described herein.

Although specific features of various embodiments of the invention may be shown in some drawings and not in others, this is for convenience only. Moreover, references to "one embodiment" in the above description are not intended to be interpreted as excluding the existence of additional embodiments that also incorporate the recited features. In accordance with the principles of the invention, any feature of a drawing may be referenced and/or claimed in combination with any feature of any other drawing.

Further aspects of the invention are provided by the subject matter of the following clauses:

A positioning method for use with a component of a turbine engine, the method comprising: measuring an outer surface of the component along an X-axis, a Y-axis, and a Z-axis to obtain three-dimensional data including X-axis data points, Y-axis data points, and Z-axis data points; extracting two-dimensional data along the X-axis and the Y-axis, including the X-axis data points and the Y-axis data points; analyzing the two-dimensional data to find a common geometric feature of the component; analyzing the two-dimensional data to determine a scan area based on the common geometric feature of the component; measuring the component within the scan area along the X-axis, the Y-axis, and the Z-axis to locate a cooling hole located on the outer surface of the component; extracting at least one surface profile of the cooling hole along the X-axis and the Y-axis; extracting an orientation of the cooling hole along the Z-axis; and calculating a three-dimensional coordinate set of the cooling hole along the X-axis, the Y-axis, and the Z-axis based on the at least one surface profile and the orientation, wherein the three-dimensional coordinate set comprises X-axis data points, Y-axis data points, and Z-axis data points.

The method in accordance with any of the preceding clauses, where measuring the component to locate a cooling hole comprises measuring a surface height and a surface width, the surface height being greater than the surface width.

The method in accordance with any of the preceding clauses, wherein measuring the component to locate a cooling hole further comprises measuring a depth that extends into the component from the outer surface, the depth varying along the surface height and the surface width.

The method in accordance with any of the preceding clauses, wherein analyzing the two-dimensional data to find a common geometric feature of the component further comprises locating a leading edge of the outer surface of the component.

The method in accordance with any of the preceding clauses, wherein analyzing the two-dimensional data to determine a scan area based on the common geometric feature of the component further comprises locating a reference corner of the leading edge.

The method in accordance with any of the preceding clauses, wherein measuring the component within the scan area to locate a cooling hole comprises calculating a position of the cooling hole in relation to the reference corner of the leading edge.

The method in accordance with any of the preceding clauses, wherein measuring the component within the scan area to locate a cooling hole comprises calculating a position of the cooling hole in relation to a reference feature of the component.

The method in accordance with any of the preceding clauses, wherein measuring the component to locate a cooling hole further comprises measuring a maximum depth of the depth, the maximum depth being at one end of the surface height.

The method in accordance with any of the preceding clauses, wherein extracting the surface profile of the cooling hole along the X-axis and the Y-axis comprises: collecting a plurality of cross-sections of the cooling hole along the surface height, wherein each of the plurality of cross-sections correlates the depth of the cooling hole to the surface width; analyzing each of the plurality of cross-sections; and detecting a maximum cross-section depth for each of the plurality of cross-sections.

The method in accordance with any of the preceding clauses, wherein extracting the orientation of the cooling hole comprises connecting along the Z-axis the maximum cross-section depth of each of the plurality of cross-sections.

The method in accordance with any of the preceding clauses, wherein analyzing an overlay of the two-dimensional data and the three-dimensional data to determine a scan area comprises determining a first boundary of the scan area at a first end of the component and a second boundary of the scan area at a second end of the component, the first end and the second end of the component being along a first axis.

The method in accordance with any of the preceding clauses, wherein measuring the component within the scan area to locate the cooling hole comprises: measuring a reflection of a light beam as reflected back from the outer surface of the component from the first end to the second end along the first axis; and calculating X-axis data points, Y-axis data points, and Z-axis data points based on the measurement of the reflection of the light beam.

The method in accordance with any of the preceding clauses, wherein measuring the reflection of the light beam further comprises measuring a line of light along a second axis, the second axis being substantially perpendicular to the first axis.

A positioning method for use with a component of a turbine engine, the method comprising: collecting a plurality of cross-sections of a cooling hole along a surface height, the plurality of cross-sections each being along an X-axis and a Y-axis, wherein each of the plurality of cross-sections correlates a depth of the cooling hole to a surface width; analyzing each of the plurality of cross-sections; detecting a maximum cross-section depth for each of the plurality of cross-sections; and extracting an orientation of the cooling hole along a Z-axis, wherein the orientation comprises the maximum cross-section depth of each of the plurality of cross-sections.

A positioning system for use with a component of a turbine engine, the system comprising: a data acquisition system configured to examine a cooling hole located on an outer surface of the component, wherein the data acquisition system comprises an imaging device configured to obtain an image of the component; and a processor in operable communication with the data acquisition system, the processor configured for: measuring the outer surface of the component along an X-axis, a Y-axis, and a Z-axis to obtain three-dimensional data including X-axis data points, Y-axis data points, and Z-axis data points; extracting two-dimensional data along the X-axis and the Y-axis, including the X-axis data points and the Y-axis data points; analyzing the two-dimensional data to find a common geometric feature of the component; analyzing the two-dimensional data to determine a scan area based on the common geometric feature of the component; measuring the component within the scan area along the X-axis, the Y-axis, and the Z-axis to locate a cooling hole located on the outer surface of the component; extracting at least one surface profile of the cooling hole along the X-axis and the Y-axis; extracting an orientation of the cooling hole along the Z-axis; and calculating a three-dimensional coordinate set of the cooling hole along the X-axis, the Y-axis, and the Z-axis based on the at least one surface profile and the orientation, wherein the three-dimensional coordinate set comprises X-axis data points, Y-axis data points, and Z-axis data points.

The system in accordance with any of the preceding clauses, wherein the cooling hole comprises: a surface width; a surface height, wherein the surface height is greater than the surface width in a general ellipse shape; and a depth, the depth comprising a maximum depth at one end of the general ellipse shape along the surface height and extending into the component from the outer surface, wherein the depth varies across the surface width and the surface height.

The system in accordance with any of the preceding clauses, wherein analyzing the two-dimensional data to find a common geometric feature of the component further comprises locating a leading edge of the outer surface of the component.

The system in accordance with any of the preceding clauses, wherein measuring the component within the scan area to locate a cooling hole comprises calculating a position of the cooling hole in relation to the leading edge.

The system in accordance with any of the preceding clauses, wherein measuring the component within the scan area to locate a cooling hole comprises calculating a position of the cooling hole in relation to a reference feature of the component.

The system in accordance with any of the preceding clauses, wherein the data acquisition system further comprises a laser line projector that is configured to locate the cooling hole configured on the outer surface of the component within the scan area.

While the invention has been described in terms of various specific embodiments, those skilled in the art will recognize that the invention can be practiced with modification within the spirit and scope of the claims.

What is claimed is:

1. A positioning method for use with a component of a turbine engine that has had a coating applied thereto following use of the component in a turbine engine, the method comprising:
    measuring, by a processor, an outer surface of the component along an X-axis, a Y-axis, and a Z-axis to obtain three-dimensional data including X-axis data points, Y-axis data points, and Z-axis data points;
    extracting, by the processor, two-dimensional data along the X-axis and the Y-axis, including the X-axis data points and the Y-axis data points;
    analyzing, by the processor, the two-dimensional data to find a common geometric feature of the component including locating a leading edge of the outer surface of the component;
    analyzing, by the processor, the two-dimensional data to determine a scan area based on the common geometric feature of the component;
    measuring, by the processor, the component within the scan area along the X-axis, the Y-axis, and the Z-axis to locate a cooling hole located on the outer surface of the component;
    extracting, by the processor, at least one surface profile of the cooling hole along the X-axis and the Y-axis;
    extracting, by the processor, an orientation of the cooling hole along the Z-axis; and
    calculating, using the processor, a three-dimensional coordinate set of the cooling hole along the X-axis, the Y-axis, and the Z-axis based on the determined at least one surface profile and the determined orientation, wherein the three-dimensional coordinate set comprises X-axis data points, Y-axis data points, and Z-axis data points; and
    reopening the located cooling hole.

2. The method of claim 1, where measuring, by the processor, the component to locate a cooling hole comprises measuring a surface height and a surface width, the surface height being greater than the surface width.

3. The method of claim 2, wherein measuring, by the processor, the component to locate a cooling hole further comprises measuring a depth that extends into the component from the outer surface, the depth varying along the surface height and the surface width.

4. The method of claim 1, wherein analyzing, by the processor, the two-dimensional data to determine a scan area based on the common geometric feature of the component further comprises locating a reference corner of the leading edge.

5. The method of claim 4, wherein measuring, by the processor, the component within the scan area to locate a cooling hole comprises calculating, by the processor, a position of the cooling hole in relation to the reference corner of the leading edge.

6. The method of claim 4, wherein measuring, by the processor, the component within the scan area to locate a cooling hole comprises calculating, by the processor, a position of the cooling hole in relation to a reference feature of the component.

7. The method of claim 3, wherein measuring, by the processor, the component to locate a cooling hole further comprises measuring a maximum depth of the depth, the maximum depth being at one end of the surface height.

8. The method of claim 3, wherein extracting, by the processor, the surface profile of the cooling hole along the X-axis and the Y-axis comprises:
    collecting a plurality of cross-sections of the cooling hole along the surface height, wherein each of the plurality of cross-sections correlates the depth of the cooling hole to the surface width;
    analyzing each of the plurality of cross-sections; and
    detecting a maximum cross-section depth for each of the plurality of cross-sections.

9. The method of claim 8, wherein extracting, by the processor, the orientation of the cooling hole comprises connecting along the Z-axis the maximum cross-section depth of each of the plurality of cross-sections.

10. The method of claim 1, wherein analyzing an overlay of the two-dimensional data and the three-dimensional data to determine a scan area comprises determining a first boundary of the scan area at a first end of the component and a second boundary of the scan area at a second end of the component, the first end and the second end of the component being along a first axis.

11. The method of claim 10, wherein measuring, by the processor, the component within the scan area to locate the cooling hole comprises:
    measuring, by the processor, a reflection of a light beam as reflected back from the outer surface of the component from the first end to the second end along the first axis; and
    calculating, by the processor, X-axis data points, Y-axis data points, and Z-axis data points based on the measurement of the reflection of the light beam.

12. The method of claim 11, wherein measuring, by the processor, the reflection of the light beam further comprises measuring a line of light along a second axis, the second axis being substantially perpendicular to the first axis.

13. A positioning method for use with a component of a turbine engine that has had a coating applied thereto following use of the component within a turbine engine, the method comprising:
  collecting, by a processor, a plurality of cross-sections of a cooling hole along a surface height, the plurality of cross-sections each being along an X-axis and a Y-axis, wherein each of the plurality of cross-sections correlates a depth of the cooling hole to a surface width;
  analyzing each of the plurality of cross-sections;
  detecting, by the processor, a maximum cross-section depth for each of the plurality of cross-sections; and
  extracting, by the processor, an orientation of the cooling hole along a Z-axis, wherein the orientation comprises the maximum cross-section depth of each of the plurality of cross-sections.

14. A positioning system for use with a component of a turbine engine that has had a coating applied thereto following use of the component in a turbine engine, the system comprising:
  a data acquisition system configured to examine a cooling hole located on an outer surface of the component, wherein the data acquisition system comprises an imaging device configured to obtain an image of the component; and
  a processor in operable communication with the data acquisition system, the processor configured for:
    measuring the outer surface of the component along an X-axis, a Y-axis, and a Z-axis to obtain three-dimensional data including X-axis data points, Y-axis data points, and Z-axis data points;
    extracting two-dimensional data along the X-axis and the Y-axis, including the X-axis data points and the Y-axis data points;
    analyzing the two-dimensional data to find a common geometric feature of the component;
    analyzing the two-dimensional data to determine a scan area based on the common geometric feature of the component;
    measuring the component within the scan area along the X-axis, the Y-axis, and the Z-axis to locate a cooling hole located on the outer surface of the component in relation to a leading edge of the component
    extracting at least one surface profile of the cooling hole along the X-axis and the Y-axis;
    extracting an orientation of the cooling hole along the Z-axis;
    calculating a three-dimensional coordinate set of the cooling hole along the X-axis, the Y-axis, and the Z-axis based on the at least one surface profile and the orientation, wherein the three-dimensional coordinate set comprises X-axis data points, Y-axis data points, and Z-axis data points; and
  reopening the located cooling hole.

15. The system of claim 14, wherein the cooling hole comprises:
  a surface width defined at the outer surface of the component;
  a surface height defined at the outer surface of the component, wherein the surface height is greater than the surface width in a general ellipse shape; and
  a depth, the depth comprising a maximum depth at one end of the general ellipse shape along the surface height and extending into the component from the outer surface, wherein the depth varies across the surface width and the surface height.

16. The system of claim 14, wherein analyzing the two-dimensional data to find a common geometric feature of the component further comprises locating a leading edge of the outer surface of the component.

17. The system of claim 16, wherein measuring the component within the scan area to locate a cooling hole comprises calculating, by the processor, a position of the cooling hole in relation to the leading edge.

18. The system of claim 14, wherein measuring the component within the scan area to locate a cooling hole comprises calculating, by the processor, a position of the cooling hole in relation to a reference feature of the component.

19. The system of claim 14, wherein the data acquisition system further comprises a laser line projector that is configured to locate the cooling hole configured on the outer surface of the component within the scan area.

* * * * *